United States Patent
Giraud et al.

(10) Patent No.: US 9,894,526 B2
(45) Date of Patent: Feb. 13, 2018

(54) MOBILE APPLICATIONS USING VEHICLE TELEMATICS DATA

(71) Applicant: MOJ.IO INC., Vancouver (CA)

(72) Inventors: Damon Giraud, Vancouver (CA); Narayan Sainaney, Vancouver (CA)

(73) Assignee: Moj.io Inc., Vancouver (CA)

( * ) Notice: Subject to any disclaimer, the term of this patent is extended or adjusted under 35 U.S.C. 154(b) by 0 days.

(21) Appl. No.: 15/177,630

(22) Filed: Jun. 9, 2016

(65) Prior Publication Data

US 2016/0295414 A1  Oct. 6, 2016

Related U.S. Application Data

(63) Continuation of application No. 14/162,799, filed on Jan. 24, 2014, now Pat. No. 9,367,968.

(60) Provisional application No. 61/849,318, filed on Jan. 25, 2013.

(51) Int. Cl.
| | |
|---|---|
| *H04W 12/08* | (2009.01) |
| *G07C 5/00* | (2006.01) |
| *H04M 1/725* | (2006.01) |
| *G07C 5/08* | (2006.01) |
| *H04W 4/00* | (2009.01) |
| *H04W 8/20* | (2009.01) |
| *H04W 12/06* | (2009.01) |
| *H04M 1/60* | (2006.01) |
| *H04W 4/04* | (2009.01) |
| *H04W 84/04* | (2009.01) |

(52) U.S. Cl.
CPC ............ *H04W 12/08* (2013.01); *G07C 5/008* (2013.01); *G07C 5/0808* (2013.01); *H04M 1/72577* (2013.01); *H04W 4/008* (2013.01); *H04W 8/205* (2013.01); *H04W 12/06* (2013.01); *H04M 1/6083* (2013.01); *H04W 4/046* (2013.01); *H04W 84/04* (2013.01)

(58) Field of Classification Search
CPC ........................... H04W 4/046; H04M 1/6083
USPC .............................................. 455/414.1, 418
See application file for complete search history.

(56) References Cited

U.S. PATENT DOCUMENTS

| | | | | |
|---|---|---|---|---|
| 2009/0287499 A1* | 11/2009 | Link, II | ............... | G06Q 30/018 705/317 |
| 2010/0210254 A1* | 8/2010 | Kelly | ..................... | G07C 5/008 455/418 |
| 2014/0058618 A1* | 2/2014 | Rude | ....................... | G06F 17/00 701/31.4 |

(Continued)

*Primary Examiner* — Vladimir Magloire
*Assistant Examiner* — Jaime Holliday
(74) *Attorney, Agent, or Firm* — Alleman Hall Creasman & Tuttle LLP

(57) ABSTRACT

Operating state information is received at an on-board telematics control unit (TCU) from an on-board diagnostic (OBD) system of a vehicle. The TCU transmits an indication of vehicle state over at least a wireless data link component of a communications network for delivery to a mobile computing device. The mobile computing device receives the indication of vehicle state and utilizes the indication of vehicle state at a mobile application program. In one example, the mobile application program presents vehicle state information via a graphical display of the mobile computing device. In another example, the mobile application program augments a functionality of the mobile computing device responsive to the indication of vehicle state.

20 Claims, 8 Drawing Sheets

(56) References Cited

U.S. PATENT DOCUMENTS

2015/0339334 A1* 11/2015 Hanke .............. G06F 17/30725
707/736

* cited by examiner

MOBILE APPLICATIONS USING VEHICLE TELEMATICS DATA

CROSS-REFERENCE TO RELATED APPLICATION

The present application is a continuation application that claims the benefit of and priority to U.S. patent application Ser. No. 14/162,799, titled SYSTEM AND METHODS FOR MOBILE APPLICATIONS USING VEHICLE TELEMATICS DATA, filed Jan. 24, 2014, which is a non-provisional application that claims the benefit of and priority to U.S. provisional patent application No. 61/849,318, titled SYSTEM AND METHODS FOR MOBILE APPLICATIONS USING VEHICLE TELEMATICS DATA, filed Jan. 25, 2013, the entire contents of each of these priority applications is incorporated herein by reference for all purposes.

BACKGROUND

Presently, on-board diagnostic (OBD) systems are incorporated into many types of vehicles, and provide an electronic solution for controlling, diagnosing, and reporting the operating state of the vehicle. OBD-II is a non-limiting example of a standard for on-board diagnostics and is available on virtually every car manufactured since Jan. 1, 2006. The OBD-II standard relates, at least in part, to emissions control, but is not limited in this respect. OBD-II may be implemented with a variety of electrical connection protocols, but the command set is defined at least in part by standard SAE J1979. The OBD-II standard includes an extensible set of proprietary diagnostic trouble codes, for example.

SUMMARY

In one aspect of the present disclosure, a telematics control unit (TCU) residing on-board a vehicle and interfacing with an on-board diagnostic (OBD) system of the vehicle receives vehicle state information from the OBD system. The TCU transmits an indication of vehicle state for delivery to a mobile computing device over at least a wireless data link component of a communications network.

The indication of vehicle state transmitted by the TCU may be based, at least in part, on the vehicle state information received at the TCU from the OBD system. Alternatively or additionally, the indication of vehicle state may be based on and/or combined with vehicle state information obtained via one or more sensors of the TCU. In at least some implementations, the TCU may store a history of vehicle state information obtained from the OBD system and/or the TCU's sensors over a period of time. The indication of vehicle state transmitted by the TCU may include or may be based on the history of vehicle state information.

The indication of vehicle state may be utilized at or by a mobile application program of the mobile computing device. The mobile application program may, for example, present the indication of vehicle state via a graphical display of the mobile computing device to inform a user of the current or historical state of the vehicle. Alternatively or additionally, the mobile application program may augment a functionality of the mobile computing device responsive to the indication of vehicle state. As a non-limiting example, the mobile application program may block the transmission, reception, and/or notification of telephone calls, text messages, and/or Internet browsing messages.

An indication of vehicle state reported by a TCU may be received at a mobile computing device or other computing device utilizing vehicle state information via a variety of communications paths. In one example, a mobile computing device may receive an indication of vehicle state directly from a TCU via a direct wireless data link established between mobile computing device and the TCU. In another example, a TCU may transmit an indication of vehicle state to a service platform that in turn transmits the indication of vehicle state or a processed form thereof to a mobile computing device via a second wireless data link. In yet another example, the service platform may transmit the indication of vehicle state or a processed form thereof to a third-party service via an application programming interface, in which the third-party service transmits the indication of vehicle state or processed form to the mobile computing device.

This summary includes only some of the concepts disclosed in greater detail by the following detailed description and associated drawings. As such, claimed subject matter is not limited to the contents of this summary.

DETAILED DESCRIPTION

The present disclosure is directed to the acquisition, processing, sharing, and utilization of vehicle telematics data. A variety of available technologies enable vehicles to communicate with remote systems for the purpose of navigation, safety, entertainment, and data collection. These technologies may be broadly referred to as telematics, and may utilize hardware and software components installed on-board the vehicle. Telematics data, including vehicle state information obtained from a vehicle's on-board diagnostic (OBD) system or telematics control unit, as well as telematics data transmitted to a vehicle provide vehicle owners, operators, and third-parties with a myriad of information concerning the operating state, location, and use of the vehicle.

Cellular technologies enable communications between a vehicle and remote computing systems via a cellular network, and at a bandwidth suitable for the purposes of transmitting telematics data and delivering navigation, safety and entertainment solutions to or from the vehicle. GPS navigation systems may be installed in most vehicles, and can provide accurate real-time location and navigation information such as speed and direction of travel. Mobile computing devices such as smartphones may include a GPS receiver, and mobile application programs running on these devices may feature location awareness. Mobile application programs may also be connected to social networks via an Internet connection to provide further sharing and dissemination of information among any number of users.

In light of these considerations, there exists a need for providing both real-time and historical automotive telematics data to remote computing systems via a network. In particular, there is a need for a technology that can anticipate or predict driver needs based on telematics data. It would be advantageous for an open solution to be provided that supports third-party services and third-party application programs, including those that may be integrated with social networking services.

Within the context of the present disclosure, a variety of different entities may take part in the acquisition, processing, sharing, and utilization of telematics data. Non-limiting examples of these entities include: (1) telematics control units (TCUs) that interface with vehicle on-board diagnostic (OBD) systems, (2) human operable client devices such as mobile and non-mobile computing devices, (3) a service platform typically hosted at one or more network accessible servers, and (4) various third-party services also typically hosted at one or more network accessible servers. While various concepts are presented herein with reference to these different entities, it will be understood that these concepts are not limited to use with any or all of these entities, unless expressly indicated.

Figure 1:
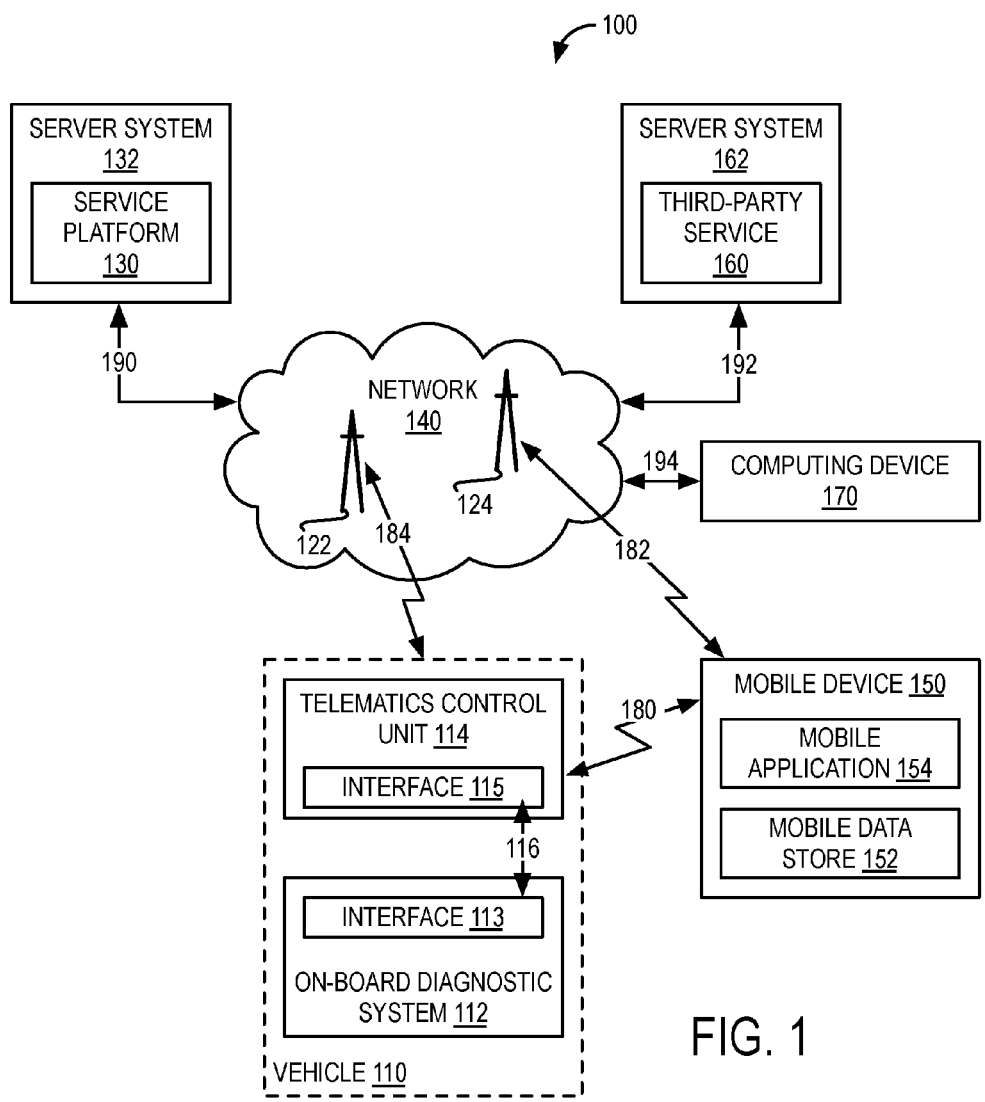
FIG. 1 is a schematic diagram depicting an example computing system.

FIG. 1 is a schematic diagram depicting an example computing system 100. Within computing system 100, an example vehicle 110 includes an OBD system 112 that obtains, processes, stores, and reports telematics data concerning operation of the vehicle, including the vehicle's various subsystems. Such telematics data may take the form of vehicle state information.

In at least some implementations, OBD system 112 may communicate with or be integrated with a control system of vehicle 110 that further includes various on-board sensors, operator controls, logic subsystems, executable instructions, data storage, electronic circuitry, etc. for controlling or enabling operation of the vehicle. Vehicle 110 may take a variety of different forms, including a land-based wheeled or track vehicle (e.g., a passenger vehicle, work vehicle, car, truck, bus, tractor, train, locomotive, motorcycle, snowmobile, etc.), an aircraft (e.g., airplane, helicopter, etc.), a marine vessel (e.g., boat or personal watercraft), or other type of vehicle.

Vehicle 110 is further depicted as including a TCU 114 located on-board the vehicle. It will be appreciated that vehicle 110 may be one of a plurality of vehicles having their own respective OBD system and on-board TCU. In at least some implementations, TCU 114 may take the form of an aftermarket device that is installed by a vehicle owner, operator, or technician after purchase of the vehicle or at the time of purchase of the vehicle. In other implementations, TCU 114 may form part of and/or be integrated with OBD system 112. In one example, TCU 114 may take the form of a special-purpose computing device, and OBD system 112 in combination with TCU 114 may collectively form an on-board computing system of vehicle 110.

TCU 114 includes an interface 115 for communicating information and/or exchanging electrical power with OBD system 112 via a respective interface 113. Such communications and/or electrical power, indicated schematically at 116, may include bi-directional communications between TCU 114 and OBD system 112, and may additionally or alternatively include unidirectional flow of communications and/or electrical power between OBD system 112 and TCU 114.

As one example, interface 113 of OBD system 112 may take the form of a hardware data link connector or data port, such as ALDL, OBD-I, OBD-1.5, OBD-II, or other suitable interface. Interface 115 of TCU 114 may take the form of a hardware data link connector or data port that corresponds to and physically mates with interface 113. Within the context of the OBD protocol standards, for example, these interfaces may be referred to as an OBD protocol compliant diagnostic port connector interface.

TCU 114 may be physically added to and/or removed from interfacing with OBD system 112 at the boundary of interfaces 115 and 113. Alternatively or additionally, a wireless link between interface 115 and interface 113 may be utilized for the exchange of communications and/or electrical power. In wireless implementations, these interfaces may include wireless receivers, transmitters, or transceivers, and associated electronic components supporting one or more wireless communication protocols and/or wireless power transmission. In at least some implementations, TCU 114 may include its own power source, while in other implementations, TCU 114 may receive electrical power from vehicle 110 via interface 115 as indicated schematically at 116.

Additional aspects of TCU 114 will be described in greater detail with reference to FIG. 5. Briefly, however, TCU 114 may take the form of a computing device, including at least a logic subsystem, a data storage subsystem, and a communications subsystem that is capable of communicating with a variety of other computing devices beyond OBD system 112. For example, FIG. 1 depicts example wireless communications between TCU 114 and mobile computing device 150 indicated by communication flow 180, and various other computing devices connected to communications network 140 as indicated by communication flow 184.

In at least some implementations, the TCUs of the present disclosure may utilize machine-to-machine (M2M) cellular data exchange to send data to and receive data from the service platform, third-party services, and/or mobile computing device in real-time via a cellular network. At least some of these communications may not traverse the Internet or other wired networks. In some use-scenarios, the data exchanged may be relatively small (e.g., 100 kB per message or set of messages) and thereby requires less bandwidth than typical email or web browsing uses, for example.

A mobile computing device, such as example mobile computing device 150, may include or take the form of a wireless enabled portable electronic device such as a smartphone, a tablet computer, mobile communications device, a notebook or laptop computer, a wearable computing device (e.g., in the form of glasses or a wristwatch), an in-vehicle computing device, etc. Within computing system 100, mobile computing device 150 includes a mobile data store 152 and a mobile application program 154.

In one example, mobile application program 154 may take the form of a general-purpose application program such as a web browser. The web browser may have been included with mobile computing device 150 at the time of purchase or may form part of an operating system of the mobile computing device. In this context, a user may operate the web browser to navigate to any accessible network resource, including websites of the world-wide-web, service platform 130, and third-party services 160.

In another example, mobile application program 154 may take the form of a special-purpose application program that is paired with and/or configured specifically for use with one or more of TCU 114, service platform 130, and/or any suitable number of third-party services 160. In such case, the special-purpose application program may not have been included with mobile computing device 150 at the time of purchase. Typically, special-purpose application programs may be subsequently downloaded from an application program marketplace or network resource hosted at service platform 130, third-party service 160, or other suitable network location over communications network 140, after which the application program may be installed and executed at a computing device, such as example mobile computing device 150. A service-enabled computing device may be refer to a general-purpose computing device upon which a special-purpose application program operates that is paired with and/or configured specifically for use with one or more of a TCU or a network service such as service platform 130 and/or third-party service 160, for example.

In at least some implementations, mobile application program 154 may be one of a plurality of application programs downloadable to and/or installed on mobile computing device 150 that are capable of interacting with TCU 114, service platform 130, and/or third-party services 160. For example, each third-party service may offer its own proprietary mobile application program in addition to or as an alternative to a native mobile application program (i.e., native to service platform 130 in contrast to third-party applications) that is offered by service platform 130 for use with TCU 114. In some use-scenarios, service platform 130 may require the installation and use of a native application program at a user's computing device prior to enabling use of that computing device with TCU 114, with third-party services 160, or with third-party applications.

Computing system 100 further includes server system 132 that hosts service platform 130. Server system 132 may include one or more server devices that are co-located and/or geographically distributed. Service platform 130 may take the form of a web service or network-based service that is accessible over at least an Internet protocol portion of communications network 140. Service platform 130 may support a programming interface, such as an API through which other computing devices and/or software modules (e.g., application programs or portions thereof) of computing system 100 may obtain information, post information, access information, initiate or receive commands, and/or communicate with or through service platform 130. FIG. 1 depicts an example communication flow 190 between service platform 130 of server system 132 and communications network 140.

In one example, TCU 114 and/or software stored within and executed by TCU 114 may be paired with or specifically configured for use in conjunction with service platform 130. TCU 114 and service platform 130 may have been developed, marketed, and/or sold by the same business entity, for example. In such case, service platform 130 may be referred to as the native service platform with regards to TCU 114. Within at least some implementations, TCU 114 may be required initialized or registered with service platform 130 before some or all operations of TCU 114 are enabled, and may utilize non-public, proprietary protocols to enforce such exclusivity. In other implementations, TCU 114 may have been developed, marketed, and/or sold by a different business entity from the operator of service platform 130. In this implementation, TCU 114 may be one of a plurality of brands of TCUs that are capable of operating in conjunction with a plurality of service platforms such as example service platform 130, and may utilize public, non-proprietary protocols to facilitate communications.

Computing system 100 of FIG. 1 may include additional computing devices, such as example server system 162 that hosts third-party service 160. Third-party service 160 may be one of a plurality of independently owned/operated third-party services for TCU 114 that are made available by one or more different business entities relative to the owner/operator of service platform 130. Some third-party services may include or take the form of a social networking service. Server system 162 may include one or more server devices that are co-located and/or geographically distributed. Third-party service 160 may take the form of a web service or network-based service that is accessible over at least an Internet protocol portion of communications network 140. Third-party service may support a programming interface, such as an API through which other computing devices and/or software modules of computing system 100 may obtain information, post information, access information, initiate or receive commands, and/or communicate with or through the third-party service. FIG. 1 depicts an example communication flow 192 between third-party service 160 of server system 162 and communications network 140.

FIG. 1 further depicts computing system 100 including additional computing devices, such as example computing device 170. Computing device 170 may take the form of a mobile or non-mobile computing device that is operable by a user (e.g., a client computing device). In at least some implementations, computing device 170 may take the form of a network communications enabled appliance or other suitable electronic device.

Communications network 140 may include or take the form of one or more wired and/or wireless networks. Communications network 140 may include one or more wide area networks such as the Internet or a portion thereof, one or more cellular networks, one or more telephone networks, various intermediate networking devices, and edge devices such as wireless and/or wired access points, etc. FIG. 1 depicts example wireless access points 122 and 124 of communications network 140. Wireless access points 122 and 124 may support the same or different wireless communications protocols. As one example, wireless access points 122 and 124 may each support communications over wide-area cellular network protocols. As another example, wireless access point 124 may support communications over a local-area network using the Wi-Fi protocol, while wireless access point 122 may support communications over a wide-area cellular network.

Wireless communications between two or more devices may take the form of relatively short-range direct wireless communications link utilizing near-field communications or a personal area network via an RFID protocol, the Bluetooth wireless communication protocol, the Wi-Fi wireless communication protocol, or other suitable wireless communication protocol. As a non-limiting example, communication flow 180 depicted in FIG. 1 between TCU 114 and mobile device 150 may take the form of relatively short-range wireless communications over a near-field communication link and/or personal area network using one or more of RFID, Bluetooth, and/or Wi-Fi communication protocols. Alternatively or additionally, communication flow 180 may take the form of a direct wired communications link between TCU 114 and mobile device 150.

In the context of example computing system 100, mobile computing device 150 is depicted as being physically nearby TCU 114 to enable wireless communications with TCU 114 over a direct wireless link. However, it will be understood that wireless communications between TCU 114 and mobile computing devices may be provided over a local area network and/or a wide area network using other suitable protocols, and may traverse one or more intermediate networking devices and/or access points, such as example wireless access points 122 and/or 124 of network 140 as indicated by wireless links 182 and 184. For example, wireless links 182 and/or 184 may utilize GSM, 3G UMTS/3GPP and/or 4G LTE/3GPP cellular protocols, Wi-Fi 802.11 protocols as defined by IEEE, Wi-Max 802.16 protocols as defined by IEEE, or other suitable wireless communication protocols. For example, communication flows 182 and 184 depicted in FIG. 1 in association with communications network 140 may take the form of relatively long-range wireless communications using one or more of these wireless communication protocols.

Figure 2:
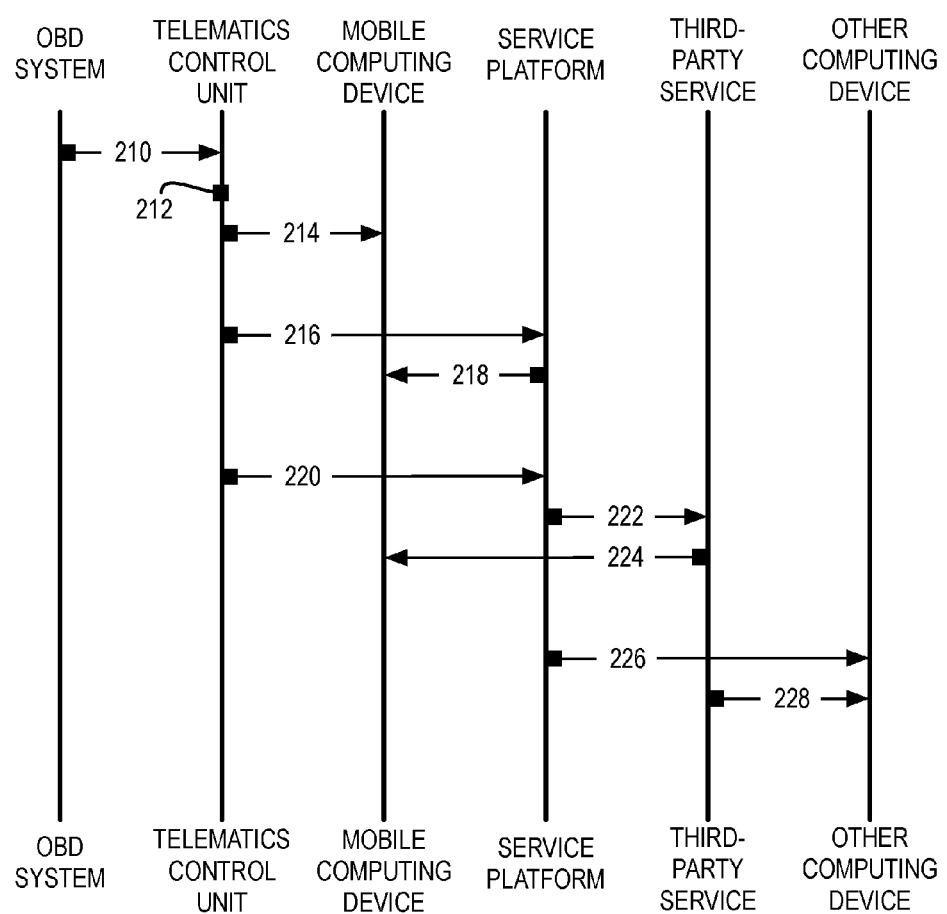
FIG. 2 is a flow diagram depicting an example method for communicating vehicle state information.

FIG. 2 is a flow diagram depicting an example method 200 for a computing system. As a non-limiting example, method 200 or portions thereof may be performed by one or more computing devices of the previously described computing system 100 of FIG. 1.

At 210, a telematics control unit (TCU) residing on-board a vehicle and interfacing with an on-board diagnostic (OBD) system of a vehicle receives vehicle state information from the OBD system. Vehicle state information may include any suitable information obtained by the OBD system from on-board vehicle sensors, operator input, the vehicle control system, etc. Non-limiting examples of vehicle state information include engine and/or electric motor on/off state, vehicle speed, vehicle mileage, vehicle location (in the case of GPS), navigation information, vehicle identification number (VIN), indication of vehicle type, engine temperature, the selected transmission gear, parking brake state, fuel level, battery level, error or service codes reported by the vehicle, exhaust system measurements, etc. Vehicle state information reported by the OBD system may include real-time and/or historical vehicle state information.

At 212, the TCU receiving vehicle state information from the OBD system may (1) store a history of the vehicle state information received from the OBD system over a period of time, (2) obtain additional vehicle state information from one or more sensors of the TCU, (3) process the vehicle state information received from the OBD system alone or in combination with additional vehicle state information received from the TCU's sensors to obtain an indication of vehicle state. Accordingly, an indication of vehicle state may include raw and/or processed vehicle state information obtained over any suitable time period from the either or both of the OBD system and/or the TCU's sensors. The indication of vehicle state may be transmitted by the TCU for delivery to the mobile computing device using a variety of different approaches, and may be accompanied by an identifier of the TCU and/or the VIN of the vehicle.

As one example, at 214, the indication of vehicle state may be transmitted by the TCU directly to the mobile computing device via a wired or wireless data link. In at least some implementations, a wired data link may be established between the mobile computing device and a USB port or other suitable data port of the TCU. In other implementations, the TCU may transmit over a wireless data link component of a communications network. The wireless data link component may take the form of a direct wireless data link established between the TCU and the mobile computing device. As non-limiting examples, the direct wireless data link may utilize Bluetooth, Wi-Fi, or a near-field (e.g., RFID, etc.) communications protocol. In another implementation, the wireless data link over which the indication is transmitted by the TCU may include a cellular data link established with a cellular network and through which the indication is communicated by at least the cellular network component for delivery to the mobile computing device either directly or via one or more wireless access points of the cellular network.

As another example, at 216, the indication of vehicle state may be transmitted by the TCU to a service platform, such as example service platform 130 of FIG. 1. In at least some implementations, the TCU may transmit to a wireless access point of a cellular network over a wireless data link component of a broader communications network that includes wired back-haul components of the Internet or other network, for example. The service platform may process the indication of vehicle state in some examples to obtain a processed form of information having any suitable format. The service platform may aggregate the indication of vehicle state with other forms or indications of vehicle state information obtained from the TCU over a period of time. The form or format of vehicle state information may be selected and obtained by the service platform specifically for utilization at or by an application program or by a third-party service. For example, a mobile application program may be paired or configured specifically for use with the service platform, and may be configured to obtain vehicle state information from the service platform in a particular form or format. At 218, the service platform may transmit the indication of vehicle state or a processed form of the indication of vehicle state to the mobile computing device. In at least some implementations, the service platform transmits the indication of vehicle state or a processed form to the mobile computing device over at least a second wireless data link component of the communications network, including a cellular wide-area network or a wireless local area network, for example.

As yet another example, at 220, the indication of vehicle state may be transmitted by the TCU to a service platform as previously described at 216. The service platform receives, stores, and may process the indication of vehicle state in some examples to obtain any suitable form of state information as previously described. At 222, the service platform may transmit the indication of vehicle state or a processed form of vehicle state information to a third-party service over a wide-area network component of the communications network (e.g., the Internet or a portion thereof). In at least some implementations, the third-party service may request, subscribe to, and/or receive the indication of vehicle state or a processed form of vehicle state information from the service platform via an application programming interface (API) of the service platform. The third-party service receives, stores, and may perform additional processing on the indication of vehicle state or previously processed form obtained from the service platform to obtain any suitable form of vehicle state information. Hence, multiple levels of processing, aggregation, etc. may be performed on vehicle state information obtained at a TCU. The third-party service may, for example, be a service of a mobile application program, and the mobile application program may be paired or configured specifically for use with the third-party service. The third-party service transmits the indication of vehicle state or processed form to the mobile computing device as indicated at 224. In at least some implementations, the third-party service transmits the indication of vehicle state or a processed form to the mobile computing device over at least a second wireless data link component of the communications network, including a cellular wide-area network or a wireless local area network, for example.

As indicated at 226, the service platform may transmit the indication of vehicle state or processed form to one or more other computing devices. These other computing devices may include client computing devices, server devices, or network enabled appliances or electronic devices, for example. Similarly, as indicated at 228, the third-party service may transmit the indication of vehicle state or processed form to other computing devices. The dissemination of information among network entities may be limited or controlled by user account permission settings, session authentication, and/or other suitable techniques. Aspects of these other computing devices will be described in greater detail with reference to FIGS. 9 and 10.

In each of the above examples, the mobile computing device (and perhaps other computing devices) receives the indication of vehicle state or a processed form that originated from the TCU based on information reported by the OBD system, and may have been delivered and/or processed by way of a service platform and/or a third-party service. The indication of vehicle state or processed form described in FIG. 2 may be one of a series of indications of vehicle state transmitted by one or more TCUs for delivery to one or more computing devices. In each case, the mobile computing device or other computing device may utilize an indication of vehicle state at an application program, for example, by: (1) presenting the indication of vehicle state or processed form to a user (e.g., via a graphical display of the computing device and/or via an audio speaker of the computing device) and/or (2) augmenting functionality of the computing device responsive to the indication of vehicle state or processed form (e.g., as will be described in further detail with reference to e.g., FIG. 8).

It will be appreciated in light of the above process flow how information may be transmitted in an opposite direction from the process flow of FIG. 2 to enable the exchange of information among or between one or more of the OBD system, TCU, client computing devices, third-party services, and the service platform. As a non-limiting example, commands initiated at or by one or more of a mobile computing device, non-mobile computing device, third-party service, and/or service platform may initiate an operation at the TCU or the OBD system. For example, a user may initiate a command at a mobile computing device that is communicated to the OBD system via the TCU, potentially traversing a third-party service or the service platform. As another example, the service platform or a third-party service may initiate a command to a TCU to cause an operation to be performed at or by the TCU or OBD system on-behalf of a user according to one or more trigger conditions. Operations performed at an OBD system may include vehicle operations, such as locking/unlocking vehicle doors, enabling/disabling a vehicle alarm system, turning the vehicle on/off, etc. It will be understood that any suitable operation may be performed at or by the vehicle responsive to commands initiated by a user device or trigger conditions set by a user.

Figure 3:
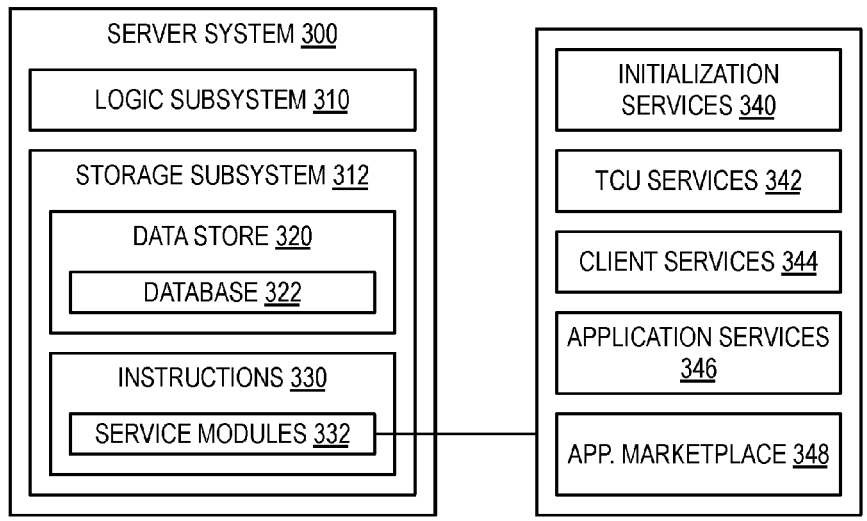
FIG. 3 is a schematic diagram depicting aspects of an example server system.

FIG. 3 is a schematic diagram depicting aspects of an example server system 300. Server system 300 of FIG. 2 provides a non-limiting example of previously described server system 132 hosting the service platform or server system 162 hosting a third-party service of FIG. 1. Server system 300 may include one or more server devices that are geographically distributed and/or geographically co-located. Server system 300 includes a logic subsystem 310 and a storage subsystem 312. Storage subsystem 312 includes a data store 320 and executable instructions 330 stored therein. Data store 320 may include a database system 322 that includes one or more databases.

Instructions 330 may include one or more service modules 332. A service module may refer to an instruction set, program, or a portion thereof. Non-limiting examples of at least some of service modules 332 include initialization services 340, TCU services 342, client services 344, application program services 346, and application program marketplace 348, among other suitable services. It will be understood that server system 300 may include additional components not depicted in FIG. 3, such as one or more network interfaces, power supplies, etc. Some or all of these components of server system 300 may provide a non-limiting example of previously described service platform 130 or third-party service 160 of FIG. 1.

Figure 4:
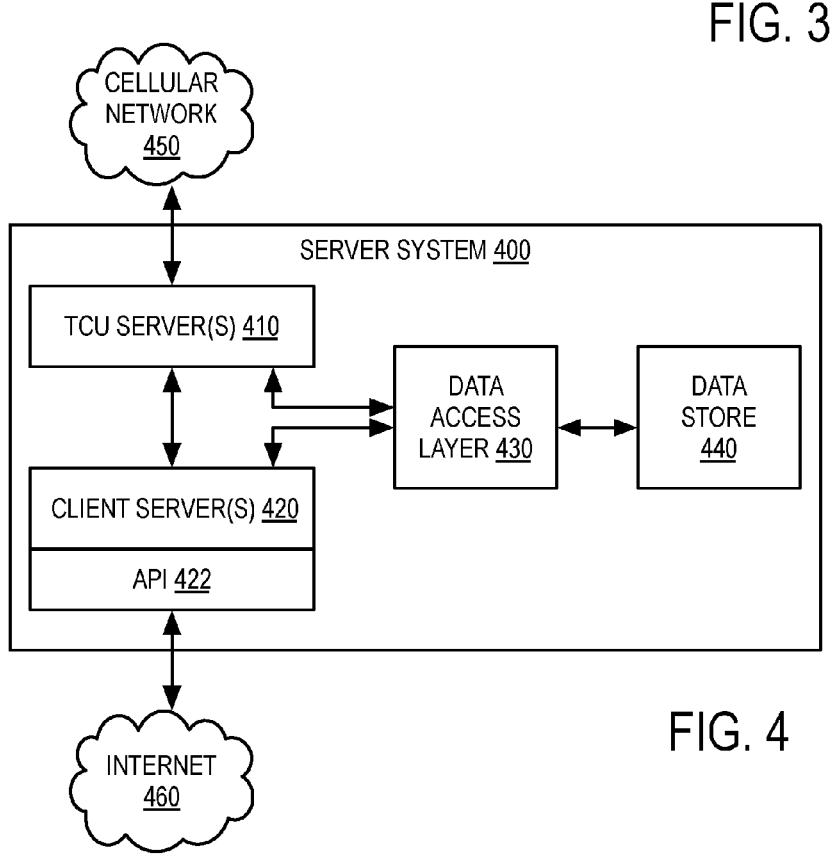
FIG. 4 is a schematic diagram depicting additional aspects of an example server system.

FIG. 4 is a schematic diagram depicting additional aspects of an example server system 400. Server system 400 of FIG. 4 provides a non-limiting example of previously described server system 132 hosting the service platform of FIG. 1 and/or server system 300 of FIG. 3. Server system 400 includes one or more TCU servers 410 that interface with TCUs, such as previously described TCU 114 of FIG. 1. As depicted in FIG. 4, communications between TCU servers 410 and TCUs may traverse a cellular network 450. Cellular network 450 may form a network component of a larger communications network (e.g., communications network 140) over which TCUs and TCU servers 410 communicate. For example, TCU servers 410 may communicate with TCUs over both a cellular network component and an Internet component.

Server system 400 further includes one or more client servers 420 that interface with a variety of other client devices, including third-party server systems/services (e.g., server system 162/service 160 of FIG. 1), mobile computing devices (e.g., mobile computing device 150 of FIG. 1), non-mobile computing devices (e.g., computing device 170 of FIG. 1), etc. As depicted in FIG. 4, communications between client servers 420 and these devices may traverse the Internet 460 or a portion thereof, and may utilize an API 422 that is supported and implemented by client servers 420. Internet 460 may form part of a larger communications network (e.g., communications network 140) over which devices communicate with client servers 420. For example, client servers 420 may communicate with these devices over both the Internet 360 and additionally over one or more cellular networks or local area wireless networks if utilized by such devices to obtain Internet connectivity.

Server system 400 further includes a data access layer 430 through which information stored in data store 440 may be accessed, retrieved, posted, etc. TCU servers 410 and/or client servers 420 may reference information stored in data store 440 responsive to communications with each other, with TCUs, and/or with other client computing devices to process requests, for example. Various aspects of FIG. 4 may take the form of one or more service modules 332 of FIG. 3 that are implemented by one or more server devices. While FIG. 4 depicts separate TCU servers and client servers, it will be understood that an individual server may take the form of both a TCU server and a client server. For example, referring also to FIG. 3, service modules 332 may include a TCU server module for providing TCU service functionality and a client server module for providing client service functionality. API 422 and/or data access layer 430 may also take the form of respective service modules. Data store 440 may correspond to previously described data store 320, and may include a database system that includes one or more information databases.

As a non-limiting implementation of FIG. 4, server system 400 may receive, via API 422, requests from third-party services (and/or mobile application programs) for vehicle state information stored in association with respective user accounts. Server system 400 may respond to these requests by transmitting vehicle state information to the third-party services (and/or mobile application programs) over the communications network for those respective user accounts. Third-party services may, in turn, deliver the requested vehicle state information to respective mobile application programs of those third-party services.

Figure 5:
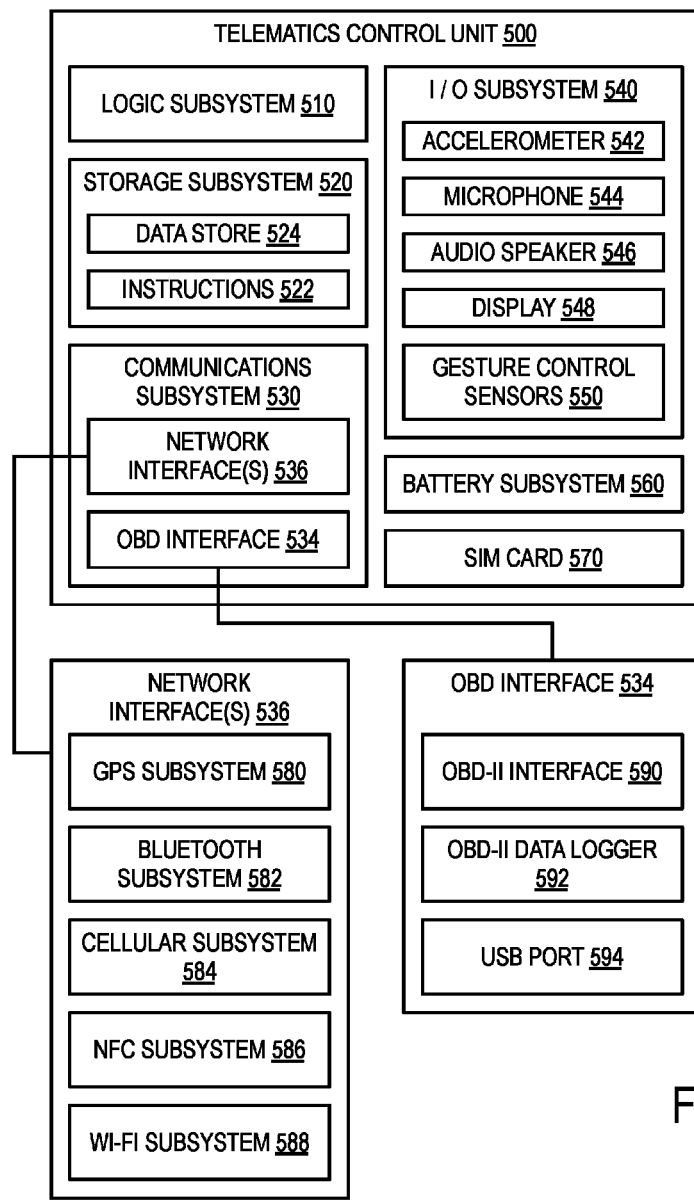
FIG. 5 is a schematic diagram depicting an example telematics control unit.

FIG. 5 is a schematic diagram depicting an example TCU 500. TCU 500 of FIG. 5 provides a non-limiting example of previously described TCU 114 of FIG. 1. TCU 500 includes a logic subsystem 510, storage subsystem 520, communications subsystem 530, input/output subsystem 540, battery subsystem 560, and SIM card 570, among other suitable components. Some or all of these components may reside within or on-board a housing of the TCU. Storage subsystem 520 includes a data store 524 and executable instructions 522. Communications subsystem 530 includes network interfaces 536 and an OBD interface 534.

Network interfaces 536 may include one or more of a GPS subsystem 580, Bluetooth communications subsystem 582, cellular communications subsystem 584, a near-field communications (NFC) subsystem 586 (e.g., an NFC chip and LEDs), and a Wi-Fi communications subsystem 588, among other suitable communications subsystems. These communications subsystems may include receivers, transmitters, transceivers, power amplifiers, filters, logic systems, or other suitable electronic circuitry for enabling communications over a respective protocol.

GPS subsystem 580 includes a receiver or transceiver that provides location information to the TCU, which may be reported to the user's mobile computing device, the service platform, third-party services, and other computing devices. The GPS subsystem enables location-aware services and applications, and may be integrated with other application programs running on the user's mobile computing device, such as a calendar application, for example. In an example scenario, the TCU, service platform, third-party service, or the mobile application program may locate and reserve available parking spots near the user's planned destination based on geo-location information reported by the TCU. In another example scenario, where the service platform or third-party service has an API connection to a parking company's payment system, the service platform or third-party service may select or determine the street-side parking spot or parking garage stall, and process payment on behalf of the user utilizing pre-stored user account information.

Bluetooth subsystem 583 may connect the TCU to a user's mobile device, and can be used to configure the user's in-vehicle experience according to the application programs and/or services to which the user subscribes. The vehicle may be the user's own vehicle or it may belong to someone else, and may be a rental vehicle, for example. Communications between the TCU and the user's mobile computing device be used to trigger actions when the mobile computing device is in proximity to the vehicle as sensed by the TCU, including e.g. locking or unlocking the doors, turning lights on and off, etc. These functions may be pre-set by the user via the mobile application program, for example. User settings may be stored in a user account within the service platform, third-party service, mobile computing device, or the TCU. In some examples, communications can provide a level of security by disabling the vehicle ignition by sending a command from the TCU via the interface with the OBD system until the user's mobile computing device is within proximity to the vehicle.

In one example scenario, Bluetooth and/or Wi-Fi subsystems may be used to capture data from inward-facing and/or outward-facing cameras of the vehicle immediately before a collision. The data may be used for insurance purposes or to combat fraud. Other equipment on-board the vehicle can be used in conjunction with camera data to provide a fuller picture of events leading up to the collision. For example, the accelerometer can provide information on the speed and acceleration of the vehicle, the direction of impact, and the condition of the vehicle before and after impact.

Near-field communications may be provided by near-field subsystem 586. Near-field communications may be used, for example, to identify the driver of vehicle based on an identifier of the mobile computing device, and to automatically configure the driving experience. For example, the TCU may auto-configure the vehicle to the driver's personalized application programs, settings, and services subscribed to by the user.

OBD interface 534 may include, for example, an OBD-II compliant interface 590, an OBD data logger (e.g., an OBD-II data logger), and a USB port for communicating with a computing device over a wired communications link. Input/output subsystem 540 may include one or more accelerometers 542, a microphone 544, an audio speaker 546, a display 548 (e.g., a graphical display or LEDs), gesture control sensors 550, and other suitable input and/or output elements that are operable and/or perceivable by a user operator. Accelerometer 542 may be used by the TCU to sense movement of the vehicle, to measure the bumpiness of a road surface, or to detect the smashing of a window in the vehicle. These measurements or indications of events may be reported to the user or other entities as previously described with reference to FIG. 2. A driver can use gesture control sensors 550 (e.g., including one or more optical sensors) to communicate with the TCU using hard movements, for example. Non-limiting examples, include, changing a song playing on the audio system of the vehicle, opening a channel for voice communication using an application program running on the TCU or on the driver's mobile device.

Figure 6:
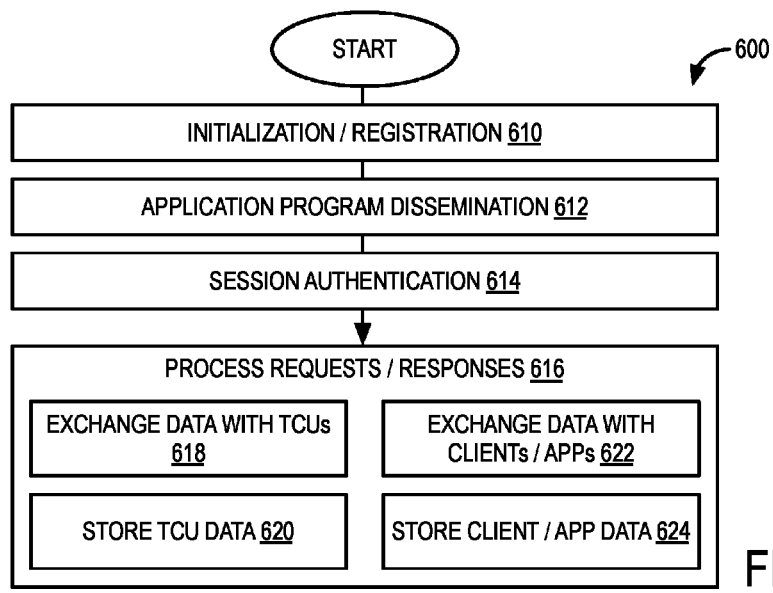
FIG. 6 is a flow diagram depicting an example method for a service platform.

FIG. 6 is a flow diagram depicting an example method 600 that may be performed by a service platform, such as example service platform 130 of FIG. 1. At 610, initialization of one or more TCUs and registration of one or more users, application program developers, computing devices, and/or application programs may be performed. Initialization may be used to provide authentication, access control, data management, and/or association of a TCU with a user and/or vehicle. Initialization will be described in greater detail with reference to FIG. 7. Registration of users, application programs, developers, computing devices, etc. may include creation of a user account, username, and user login credentials also for the purpose of authentication, access control, and data management. At 612, application programs may be disseminated to computing devices, including mobile application programs downloaded and installed on mobile computing devices. At 614, sessions between the service platform and other network entities, including TCUs, client computing devices, third-party services, and/or application programs may be authenticated by the service platform. At 616, the service platform processes requests and responses for information among network entities by exchanging data with TCUs at 618, storing TCU data 620, exchanging data with clients and/or application programs at 622, and/or storing client and/or application program data at 624.

Figure 7:
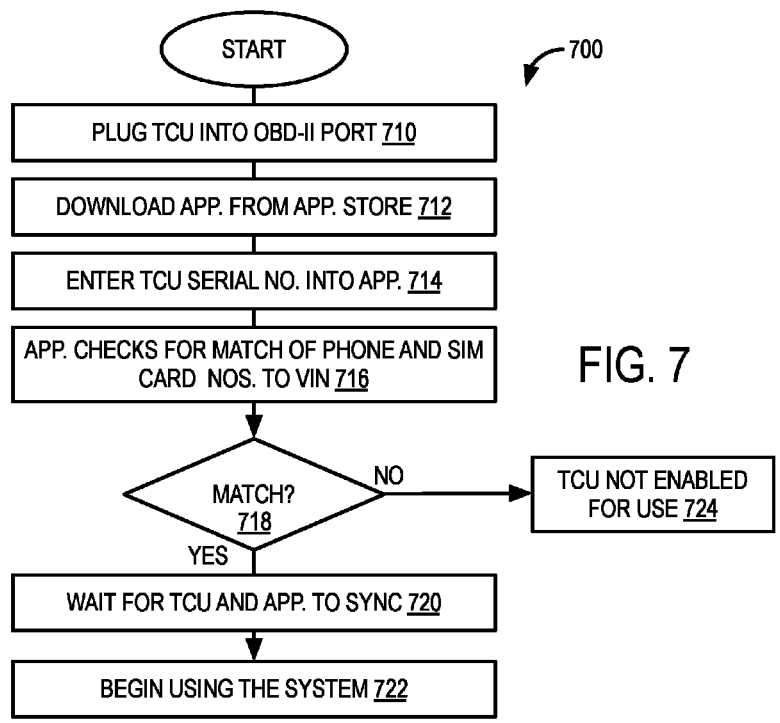
FIG. 7 is a flow diagram depicting an example method for initializing a telematics control unit.

FIG. 7 is a flow diagram depicting an example method 700 for initializing a TCU. At 710, the TCU may be installed on-board the vehicle to interface with the OBD system. For example, the TCU may be plugged into an OBD-II port or other suitable port of the OBD system. In at least some implementations, the TCU may establish a connection with the service platform over at wireless data link component (e.g., a cellular network) of a communications network to communicate a SIM card number of the TCU and/or VIN of the vehicle that has been received by the TCU from the OBD system. The service platform receives and may store a relationship or association between the TCU indicated by the SIM number and the VIN.

At 712, an application program (e.g., a mobile application program) may be downloaded and installed by a computing device (e.g., mobile application program) over a communications network from an application program marketplace or online storefront. At 714, a serial number or other suitable identifier of the TCU may be entered into the application program at the computing device. The serial number or identifier may be printed on a housing of the TCU or may accompany the TCU in the form of product literature, for example. In at least some implementations, the serial number or other identifier may be manually entered by a user at the computing device using one or more keystrokes or a touch-screen inputs, and the number or identifier may be received by the application program. In other implementations, an identifier of the TCU may be received as an image of an optical code captured via a camera of the computing device.

At 716, the application program may check for a match of some or all of: (1) the identifier of the computing device, (2) the TCU serial number or other identifier, (3) a number for the SIM card located within the TCU, and (4) the VIN of the vehicle. The serial number or other identifier of the TCU submitted via the application program may be transmitted over a wired or wireless communications network to the service platform by the application program. The service platform may receive and store the TCU identifier and an identifier of the computing device. The identifier of the computing device may take the form of a mobile computing device identifier (e.g., a SIM card number of the mobile computing device), a phone number of the mobile computing device, an application program identifier, a user account identifier, an IP address, etc. that is capable of distinguishing multiple computing devices or users from each other.

The service platform may compare the TCU serial number or identifier received from the application program to determine if a matched relationship exists with the SIM card number of the TCU. In at least some implementations, an association between the SIM card number and the TCU serial number or identifier may be established at the service platform prior to sale and distribution of the TCU. Responsive to a match between the SIM card number and the TCU serial number, an association may be established by the service platform between some or all of: (1) an identifier of the computing device, (2) the TCU serial number or identifier, (3) the SIM card number of the TCU, and (4) the VIN of the vehicle. In at least some implementations, the application program may require that the user manually enter the VIN of the vehicle, which can be additionally compared to the VIN reported by the TCU at the service platform.

As an alternative to the above implementation, the service platform may transmit to the computing device, the SIM card number of the TCU and/or VIN of the vehicle that was previously reported by the TCU. The application program may perform the comparison of some or all of: (1) the identifier of the computing device, (2) the TCU serial number or identifier, (3) the SIM card number of the TCU, and (4) the VIN of the vehicle to determine if a match exists. In yet another implementation, the TCU may provide the VIN and/or SIM card number of the TCU directly to the computing device via a wired or wireless communications link.

In either of the above implementations, it may be judged at 718 whether a matched relationship exists between some or all of the (1) the identifier of the computing device, (2) the TCU serial number or identifier, (3) the SIM card number of the TCU, and (4) the VIN of the vehicle. If a matched relationship is judged to exist, then the TCU and the application program may be synched at 720. Synching of the TCU and application may include the exchange of vehicle state information as previously described with reference to FIG. 2, for example. At 722, the user may begin using the information system established between the TCU, the application program, and/or the service platform. If a matched relationship is judged not to exist at 718, then the TCU may not be enabled for use at 724. Where the TCU is not enabled for use, synching may not be permitted between the TCU and the application program, and vehicle state information may not be transmitted to the application program or to the service platform for delivery to the application program. While initialization has been described in FIG. 7 with respect to the service platform, a similar approach may be used to initialize third-party applications with a TCU via a third-party service hosted at a server system.

It will be understood that associations established between TCU identifiers, VINs, and computing device identifiers may be stored in a database system as part of a user account. Each user account may include one or more TCU identifiers, VINs, computing device identifiers, etc., thereby enabling the service platform to facilitate the delivery of information and/or commands between TCUs, computing devices, or third-party services of a particular user. In this manner, individual TCUs and individual computing devices (including active user sessions) may be distinguished from each other within an ecosystem of hundreds, thousands, millions, or more TCUs and/or computing devices.

Figure 8:
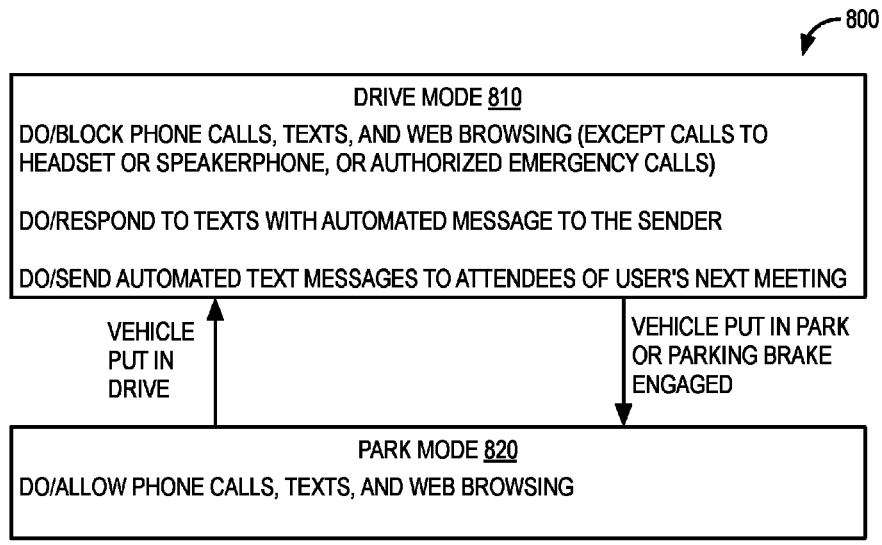
FIG. 8 is a state diagram depicting an example of augmenting mobile device functionality responsive to vehicle state information.

FIG. 8 is a state diagram 800 illustrating an example use-scenario related to the blocking of certain activities or features at a mobile computing device while a vehicle is in a drive mode. As previously described with reference to FIG. 2, vehicle state information, including an indication of vehicle state communicated by a TCU to a mobile computing device may be utilized by a mobile application program to augment the functionality of the mobile computing device. In at least some implementation, an indication of vehicle state may include whether the vehicle is in a drive state or a park state. As one example, the indication of vehicle state may be utilized to augment the functionality of the mobile computing device during a drive mode 810 by, responsive to the indication received at the mobile computing device identifying the vehicle as being in the drive state, the mobile application program and/or service platform blocks one or more of the transmission, reception, and/or notification at the mobile computing device of one or more telephone calls, text messages, and/or Internet browsing messages. During a park mode 820, responsive to the indication received at the mobile device identifying vehicle as being in the park state, the mobile application program and/or service platform allows the transmission, reception, and/or notification at the mobile computing device of one or more telephone calls, text messages, and/or Internet browsing messages. In at least some implementations, certain exceptions to the blocking of telephone calls may be defined, such as emergency calls or hands-free calls using a headset or speakerphone, for example.

The vehicle state information received from the (OBD) system at the TCU may include an indication of whether a parking brake of the vehicle is engaged or disengaged. The vehicle may be indicated to be in the park state by the TCU if the parking brake is indicated by the vehicle state information as being engaged. Alternatively or additionally, the TCU may infer an indication of whether the vehicle is in a drive state or park state based on GPS and/or accelerometer sensor measurements obtained by the TCU. In either example, information communicated by the TCU that indicates operating state of the vehicle may be utilized to select either the park mode or the drive mode for purposes of augmenting the functionality of the mobile computing device.

The TCU, mobile computing device, and/or service platform may be responsive to changing vehicle states. For example, when or if the vehicle is placed into a drive state by an operator, the mobile computing device may respond to incoming calls or text messages with an automated messages. The mobile computing device may also send a text message or other suitable message type to attendees of an upcoming meeting. When or if the vehicle is put in "park" or the parking brake is engaged by the vehicle's operator, the mobile device leaves drive mode 810 and enter park mode 820.

Figure 9:
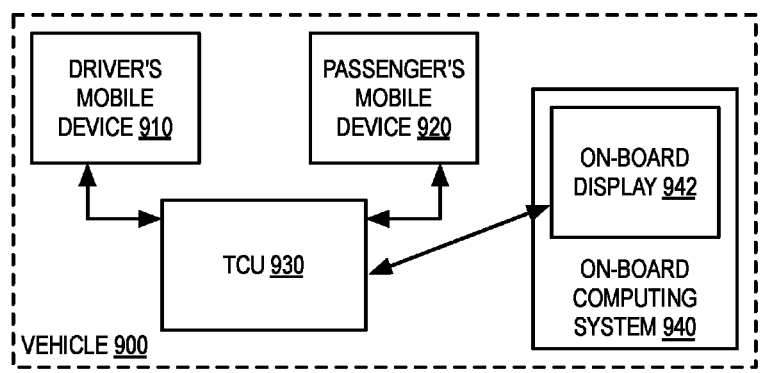
FIG. 9 is a schematic diagram depicting an example use-scenario.

FIG. 9 is a schematic diagram depicting an example use-scenario involving a vehicle, TCU, and multiple mobile computing devices. Within FIG. 9, a TCU 930 may be used to provide a digital hub for a vehicle 900. In this configuration, the TCU can provide a local area network (e.g., a Wi-Fi "hotspot") to mobile computing devices located within the vehicle, thereby providing a high speed Internet connection to mobile device 910, 920, and on-board computing system 940, including on-board display 942. In this context, TCU 930 may communicate with Internet web-based services via a high-speed cellular wireless data link utilizing, LTE 4G protocols, for example. Example applications may include the streaming of video from HD cameras in the vehicle to a webpage and/or the streaming of movies from the Internet to one or more of mobile device 910, 920, and/or on-board computing system 940.

Figure 10:
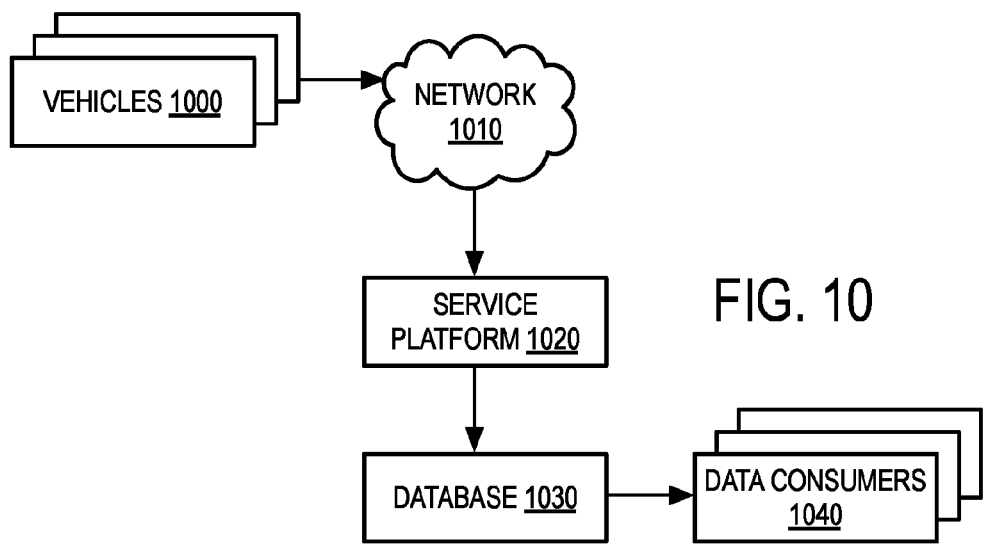
FIG. 10 is a schematic diagram depicting another example use-scenario.

FIG. 10 is a schematic diagram depicting another example use-scenario involving multiple vehicles equipped with respective TCUs and multiple data consumers that receive vehicle state information from those TCUs via a service platform or other suitable third-party service. Within FIG. 10, TCUs located at vehicles 1000 upload data over a network 1010 to a service platform 1020, which may refer to previously described service platform 130 of FIG. 1 or alternatively to a third-party service. Service platform 1020 stores data obtained from vehicles 1000 in a database 1030. Data consumers 1040 can access the database and receive data from the vehicles including, for example, data on vehicle use and performance, and driver behavior.

In at least some implementations, data from vehicles 1000 may be provided to owners, operators, or third-party users in exchange for the benefit of using a mobile application program, such as mobile application program 154 of FIG. 1. Data consumers 1040 may use and/or sell data stored in database 1030. Aspects of the present disclosure may be advantageous to a driver of a vehicle in areas related to safety, family, convenience, productivity, navigation, geo-gaming, efficiency, entertainment, lifestyle, and social networking. Non-limiting examples of these applications include: (1) an automated parking assistant, (2) an automatic crash responder, (3) a police speed control notifier, (4) integrated roadside assistance support, (5) car-to-home automation: doors, lights, appliances, etc., (6) walk up hands-free car door lock/unlock, and (7) turn by turn eyes-free navigation. Other applications may include V2V (vehicle to vehicle) applications between two or more TCUs. Bluetooth 4.0 wireless technology or other suitable wireless protocol, for example, may enable communications between vehicles in close proximity to one another. Vehicles may also communicate with each other over a local area or wide area network via respective TCUs.

In other use-scenarios, mobile application programs implementing aspects of the subject matter described herein may be combined with social network data and/or integrated with a social networking service such as Facebook™. For example, a mobile application program may provide a login to a social networking service with which vehicle state information may be shared, including vehicle location or other information, for example. The service platform and/or social networking service may store a relationship between user accounts in each service to enable the mapping of content from the service platform to the social network. Typically, social networking services would receive the vehicle state information via an API of the service platform, and would associate the vehicle state information with a user account attributed to that vehicle state information within the social networking environment.

In at least some implementations, the TCUs described herein may be transferable between vehicles (such as one or more of vehicles 1000), and may be suitable for fleet management applications. For example, an owner, operator, or other third-party may use any compatible TCU in any vehicle in combination with a user's mobile device while enabling the user's application programs to access and utilize information obtained from that TCU or otherwise function in concert with that TCU. The technology described herein may support the provision of data suitable for providing information at the time of re-sale of a vehicle and/or may support user-based insurance. For example, data from a TCU may be stored in database 1030 to provide a history of a driver's driving habits. The data in the database relating to the driver may be accessed for the purposes of examining the driver's driving behavior, especially as it relates to risk and insurance rates.

Figure 11:
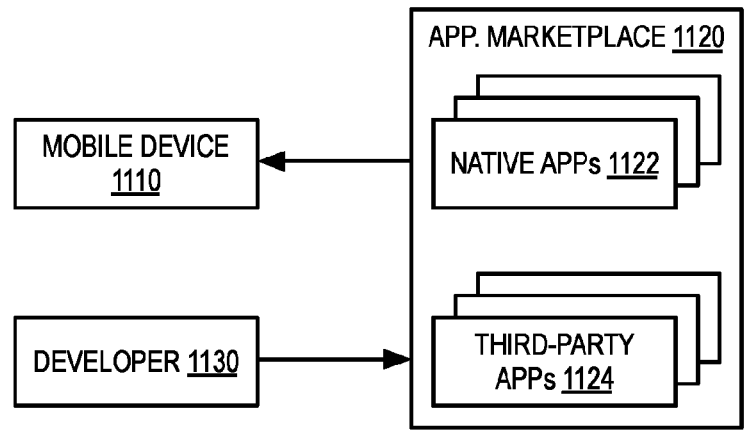
FIG. 11 is a schematic diagram depicting an example application program marketplace.

FIG. 11 is a schematic diagram depicting yet another example use-scenario involving an application program marketplace 1120. The application program marketplace may enable users to download and install native and/or third-party application programs over a communications network from a network location. An application program developer eco-system, for example, may include mobile device 1110, marketplace 1120, and developer 1130. In some scenarios, one or more native application programs may be provided at no charge to mobile device 1110. Developer 1130 may develop application programs for marketplace 1120, and may make them available to mobile device 1110 for free or for purchase. The developer eco-system may be associated with various business models. In one scenario, a "freemium" business model may be used. In the freemium business model, services to a user may be provided free (or subsidized) by ecosystem partners such as insurance companies, automotive retailers, and cellular/Internet service provider companies. Partners may target specific demographics of drivers in real-time. Targeting may be enabled by vehicle data and/or user data acquired from TCUs and from the users via their respective computing devices.

Figure 12:
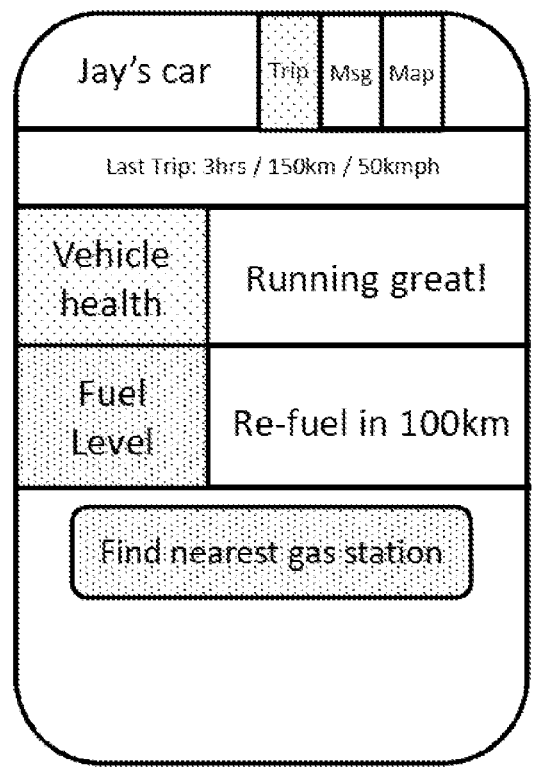
FIG. 12 is a diagram depicting an example graphical user interface of a computing device presenting vehicle state information.

FIG. 12 is a diagrammatic view of an example graphical user interface. The graphical user interface of FIG. 12 may be presented by an application program of a computing device, such as a mobile computing device, for example. In at least some implementations, the OBD system in combination with the TCU may provide information on the health of vehicle to the mobile computing device for presentation. A news-feed on mobile application program 154 of FIG. 1, for example, may be used to notify the user when or if the vehicle requires attention, and may suggest service locations capable of addressing issues communicated by the OBD system. As an example, in FIG. 12, the user is presented with a button on the screen for obtaining additional information regarding the nearest gas station. A user may also choose to share location and/or vehicle health information with providers of goods and services within the user's coverage area, and may have notices, discounts or other incentives "pushed" to the device in response to a vehicle's needs.

Additional aspects of the present disclosure will be described with reference to the preceding figures. In an example use-scenario, the service platform or third-party service may enable retailers or other advertisers to bid on certain on-board diagnostic codes so that the retailer's information is presented to the user in the event that the code is reported by the user's vehicle. Related advertisements (not shown e.g., in FIG. 12) may be displayed on the screen alongside online content, for example. Advertising may be location aware using geo-location information reported by the TCU and/or the geo-location of the mobile device. In some examples, advertising may be related to the health of the vehicle as obtained from the OBD system.

In another example use-scenario, a user may choose to transmit on-board diagnostic data, such as one or more of the diagnostic trouble codes (DTC) reported by the OBD system to a nearby service garage to obtain an estimate for any necessary repair or service work. A user may authorize service personnel to unlock the vehicle for access when the vehicle is parked and unattended by the user. The service platform and/or third-party services may automate the payment process using user account information previously obtained from the user.

In yet another example use-scenario, a user may prepare to leave their residence for work in the morning. The user may, for example, have a meeting downtown in an hour. A TCU installed on-board the vehicle may sense the proximity of the user's mobile device from over a Bluetooth or NFC wireless communications link, and may unlock the doors of the vehicle as the user approaches. When the user starts the vehicle and pulls away from the driveway of the residence, a mobile application program operating at the mobile computing device may connect to the service platform by API (such as API 422 of FIG. 4) initiate a command to another computing device (e.g., computing device 170 in FIG. 1) located at the residence (e.g., one or more network enabled appliances of the residence) to lock the door of the residence and/or to shut off the lights of the residence. For example, the service platform or third-party service may use the ZigBee protocol suite or any other suitable personal area network to communicate commands to network enabled appliances. In other instances, a smart device server located at the residence may lock the door and/or turn off the lights when the mobile computing device and/or vehicle TCU pulls away from the driveway. It will be appreciated that the reverse approach may be utilized to initiate operations at a vehicle or residence responsive to a mobile computing device carried by the user leaving the vehicle and approaching the residence.

The above described methods and processes may be tied to a computing system including one or more computing devices. In particular, the methods and processes described herein may be implemented as one or more applications, services, application programming interfaces, computer libraries, and/or other suitable computer programs or instruction sets.

The computing devices described herein have been shown in simplified form. It is to be understood that virtually any computer architecture may be used without departing from the scope of this disclosure. A computing device or portions thereof may take the form of one or more of a mainframe computer, a server computer, a computing device residing on-board a vehicle, a desktop computer, a laptop computer, a tablet computer, a home entertainment computer, a network computing device, a mobile computing device, a mobile communication device, a gaming device, etc.

A logic subsystem may include one or more physical devices configured to execute instructions held in storage subsystem. For example, a logic subsystem may be configured to execute that are part of one or more applications, services, programs, routines, libraries, objects, components, data structures, or other logical constructs. Such instructions may be implemented to perform a task, implement a data type, transform the state of one or more devices, or otherwise arrive at a desired result.

A logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

A storage subsystem may include one or more physical, non-transitory, devices configured to hold data in a data store and/or instructions executable by the logic subsystem to implement the herein described methods and processes. When such methods and processes are implemented, the state of the storage subsystem may be transformed (e.g., to hold different data or other suitable forms of information).

A storage subsystem may include removable media and/or built-in devices. A storage subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. A storage subsystem may include devices with one or more of the following characteristics: volatile, nonvolatile, dynamic, static, read/write, read-only, random access, sequential access, location addressable, file addressable, and content addressable. In at least some implementations, a logic subsystem and a storage subsystem may be integrated into one or more common devices, such as an application specific integrated circuit or a system on a chip.

It is to be appreciated that a storage subsystem includes one or more physical, non-transitory devices. In contrast, in at least some implementations and under select operating conditions, aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module" or "program" may be used to describe an aspect of a computing system that is implemented to perform one or more particular functions. In some cases, such a module or program may be instantiated via a logic subsystem executing instructions held by a storage subsystem. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc.

It is to be appreciated that a "service", as used herein, may be an application program or other suitable instruction set executable across multiple sessions and available to one or more system components, programs, and/or other services. In at least some implementations, a service may run on a server or collection of servers responsive to a request from a client.

While the disclosed subject matter is directed to a vehicle-based implementations, it will be understood that aspects of the disclosed subject matter may be used outside of a vehicle context, such as within buildings or on-board non-moveable machinery. Outside of the vehicle context, a TCU may interface with control systems or electronic devices associated with other subjects to be monitored or controlled.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A method for a computing system including one or more server devices hosting a vehicle telematics service, the method comprising:

receiving at the vehicle telematics service over a wide area network, a vehicle identifier of a vehicle and a first identifier of an on-board telematics control unit located on-board the vehicle and interfacing with an on-board diagnostic (OBD) system of the vehicle at an OBD interface, the vehicle identifier received by the on-board telematics control unit from the OBD system of the vehicle via the OBD interface, the first identifier and vehicle identifier transmitted by the on-board telematics control unit over a wireless network component of the wide area network;

associating the vehicle identifier with the first identifier in a database system accessible to the vehicle telematics service, the first identifier further associated with a pre-established identifier of the on-board telematics control unit in the database system;

registering a user for the vehicle telematics service by creating a user account for the user having associated user login credentials;

authenticating a session at the vehicle telematics service for the user with a mobile computing device based on the user login credentials provided by the user via a mobile application program of the mobile computing device;

following authentication, receiving over the wide area network at the vehicle telematics service, a purported identifier of the on-board telematics control unit transmitted by the mobile computing device over another wireless network component of the wide area network, the purported identifier manually entered by the user via the mobile application program of the mobile computing device;

comparing the purported identifier received from the mobile computing device to the pre-established identifier associated with the first identifier in the database system to determine if a matched relationship exists between the purported identifier and the pre-established identifier; and upon determining that the matched relationship exists between the purported identifier and the pre-established identifier, associating the vehicle identifier of the vehicle and the first identifier of the on-board telematics control unit with the user account in the database system.

2. The method of claim 1, further comprising:

receiving at the vehicle telematics service over the wide area network, vehicle state information for the vehicle transmitted by the on-board telematics control unit over a wireless network component of the wide area network, the vehicle state information accompanied by one or more of the vehicle identifier and/or the first identifier; and associating the vehicle state information with the user account in the database system based on one or more of the vehicle identifier and/or the first identifier that accompanied the vehicle state information.

3. The method of claim 2, further comprising:

providing the mobile computing device access to the vehicle state information following authentication of the user with the mobile computing device based on the user credentials.

4. The method of claim 3, wherein providing access to the mobile computing device includes:

receiving a request from the mobile computing device for the vehicle state information associated with the user account; and transmitting the vehicle state information to the mobile computing device responsive to the request for presentation within the mobile application program at the mobile computing device.

5. The method of claim 3, further comprising:
wherein the vehicle state information transmitted to the mobile computing device augments functionality of the mobile computing device via the mobile application program responsive to the vehicle state information, including blocking one or more of: transmission, reception, and/or notification at the mobile computing device for one or more of: telephone calls, text messages, and/or internet browsing messages.

6. The method of claim 1, further comprising:
upon determining that the matched relationship exists between the purported identifier and the pre-established identifier, enabling communications between the mobile computing device and the on-board telematics control unit via one or more of the service platform and/or a near-field wireless communications link or a wireless personal area network.

7. The method of claim 1, wherein the vehicle identifier includes a vehicle identifier number (VIN).

8. The method of claim 1, wherein the first identifier includes a SIM card number of the on-board telematics control unit.

9. The method of claim 1, wherein the pre-established identifier is a serial number that distinguishes the on-board telematics control unit from a plurality of other on-board telematics control units within a device ecosystem.

10. A computing system, comprising:
a server system including one or more server devices hosting a vehicle telematics service, the vehicle telematics service stored in one or more storage devices of the server system as instructions that are executable by one or more processors of the server system to:
receive at the vehicle telematics service over a wide area network, a vehicle identifier of a vehicle and a first identifier of an on-board telematics control unit located on-board the vehicle and interfacing with an on-board diagnostic (OBD) system of the vehicle at an OBD interface, the vehicle identifier received by the on-board telematics control unit from the OBD system of the vehicle via the OBD interface, the first identifier and vehicle identifier transmitted by the on-board telematics control unit over a wireless network component of the wide area network;
associate the vehicle identifier with the first identifier in a database system accessible to the vehicle telematics service, the first identifier further associated with a pre-established identifier of the on-board telematics control unit in the database system;
register a user for the vehicle telematics service by creating a user account for the user having associated user login credentials;
authenticate a session at the vehicle telematics service for the user with a mobile computing device based on the user login credentials provided by the user via a mobile application program of the mobile computing device;
following authentication, receive over the wide area network at the vehicle telematics service, a purported identifier of the on-board telematics control unit transmitted by the mobile computing device over another wireless network component of the wide area network, the purported identifier manually entered by the user via the mobile application program of the mobile computing device;
compare the purported identifier received from the mobile computing device to the pre-established identifier associated with the first identifier in the database system to determine if a matched relationship exists between the purported identifier and the pre-established identifier; and
upon determining that the matched relationship exists between the purported identifier and the pre-established identifier, associate the vehicle identifier of the vehicle and the first identifier of the on-board telematics control unit with the user account in the database system.

11. The computing system of claim 10, wherein the instructions are further executable by the one or more processors to:
receive at the vehicle telematics service over the wide area network, vehicle state information for the vehicle transmitted by the on-board telematics control unit over a wireless network component of the wide area network, the vehicle state information accompanied by one or more of the vehicle identifier and/or the first identifier; and
associate the vehicle state information with the user account in the database system based on one or more of the vehicle identifier and/or the first identifier that accompanied the vehicle state information.

12. The computing system of claim 11, wherein the instructions are further executable by the one or more processors to:
provide the mobile computing device access to the vehicle state information following authentication of the user with the mobile computing device based on the user credentials.

13. The computing system of claim 12, wherein access to the mobile computing device is provided by receiving a request from the mobile computing device for the vehicle state information associated with the user account, and transmitting the vehicle state information to the mobile computing device responsive to the request for presentation within the mobile application program at the mobile computing device.

14. The computing system of claim 12, further comprising:
wherein the vehicle state information transmitted to the mobile computing device augments functionality of the mobile computing device via the mobile application program responsive to the vehicle state information, including blocking one or more of: transmission, reception, and/or notification at the mobile computing device for one or more of: telephone calls, text messages, and/or internet browsing messages.

15. The computing system of claim 10, wherein the instructions are further executable by the one or more processors to:
upon determining that the matched relationship exists between the purported identifier and the pre-established identifier, enable communications between the mobile computing device and the on-board telematics control unit via one or more of the service platform and/or a near-field wireless communications link or a wireless personal area network.

16. The computing system of claim 10, wherein the vehicle identifier includes a vehicle identifier number (VIN);
wherein the first identifier includes a SIM card number of the on-board telematics control unit; and
wherein the pre-established identifier is a serial number that distinguishes the on-board telematics control unit from a plurality of other on-board telematics control units within a device ecosystem.

17. A method for a computing system including one or more server devices hosting a vehicle telematics service, the method comprising:

receiving at the vehicle telematics service over a wide area network, a vehicle identifier of a vehicle and a first identifier of an on-board telematics control unit located on-board the vehicle and interfacing with an on-board diagnostic (OBD) system of the vehicle at an OBD interface, the vehicle identifier received by the on-board telematics control unit from the OBD system of the vehicle via the OBD interface, the first identifier and vehicle identifier transmitted by the on-board telematics control unit over a wireless network component of the wide area network;

associating the vehicle identifier with the first identifier in a database system accessible to the vehicle telematics service, the first identifier further associated with a pre-established identifier of the on-board telematics control unit in the database system;

registering a user for the vehicle telematics service by creating a user account for the user having associated user login credentials;

authenticating a session at the vehicle telematics service for the user with a mobile computing device based on the user login credentials provided by the user via a mobile application program of the mobile computing device;

following authentication, receiving over the wide area network at the vehicle telematics service, a purported identifier of the on-board telematics control unit transmitted by the mobile computing device over another wireless network component of the wide area network, the purported identifier including an optical code captured by a camera of the mobile computing device;

comparing the purported identifier received from the mobile computing device to the pre-established identifier associated with the first identifier in the database system to determine if a matched relationship exists between the purported identifier and the pre-established identifier; and upon determining that the matched relationship exists between the purported identifier and the pre-established identifier, associating the vehicle identifier of the vehicle and the first identifier of the on-board telematics control unit with the user account in the database system.

18. The method of claim 17, further comprising:

receiving at the vehicle telematics service over the wide area network, vehicle state information for the vehicle transmitted by the on-board telematics control unit over a wireless network component of the wide area network, the vehicle state information accompanied by one or more of the vehicle identifier and/or the first identifier; and associating the vehicle state information with the user account in the database system based on one or more of the vehicle identifier and/or the first identifier that accompanied the vehicle state information.

19. The method of claim 18, further comprising:

providing the mobile computing device access to the vehicle state information following authentication of the user with the mobile computing device based on the user credentials, wherein providing access to the mobile computing device includes:

receiving a request from the mobile computing device for the vehicle state information associated with the user account; and transmitting the vehicle state information to the mobile computing device responsive to the request for presentation within the mobile application program at the mobile computing device.

20. The method of claim 17, further comprising: upon determining that the matched relationship exists between the purported identifier and the pre-established identifier, enabling communications between the mobile computing device and the on-board telematics control unit via one or more of the service platform and/or a near-field wireless communications link or a wireless personal area network.

* * * * *